United States Patent [19]

Fashbaugh et al.

[11] 3,983,636

[45] Oct. 5, 1976

[54] HYDRAULIC FLUIDIC LEVEL CONTROL SYSTEM

[75] Inventors: Richard H. Fashbaugh, Reno, Nev.; Edward R. Durlak, Thousand Oaks, Calif.

[73] Assignee: The United States of America as represented by the Secretary of the Navy, Washington, D.C.

[22] Filed: June 19, 1975

[21] Appl. No.: 588,450

[52] U.S. Cl. .................................. 33/346; 33/391; 73/515
[51] Int. Cl.² ........................................ G01C 9/12
[58] Field of Search ............ 33/365, 346, 366, 391; 73/515

[56] References Cited
UNITED STATES PATENTS

| | | | |
|---|---|---|---|
| 2,176,807 | 10/1939 | Wunsch | 33/346 X |
| 3,014,373 | 12/1961 | Lindbom | 73/515 |
| 3,126,640 | 3/1964 | Plasser et al. | 33/346 X |
| 3,541,865 | 11/1970 | Brown | 73/515 |
| 3,572,132 | 3/1971 | Trugman | 73/515 |

*Primary Examiner*—Charles E. Phillips
*Attorney, Agent, or Firm*—Richard S. Sciascia; J. M. St.Amand; Darrell E. Hollis

[57] ABSTRACT

A hydraulic fluidic level sensor for detecting an angular deviation from gravity vertical comprising an inverted pendulum in conjunction with two fluidic proximity sensors to provide an output signal proportional to the angular deviation. Opposing fluid jets from the fluidic proximity sensors impinge on the inverted pendulum shaft to produce a net jet force which counterbalances the pendulum moment due to gravity. The pressure signal output from the proximity sensors is proportional to the angular deviation from the vertical and provides the input signal to a level control system. A secondary pendulum damping system is used to provide necessary viscous damping.

3 Claims, 3 Drawing Figures

３,983,636

HYDRAULIC FLUIDIC LEVEL CONTROL SYSTEM

BACKGROUND OF THE INVENTION

1. Field of the Invention

This invention relates generally to level control sensors and more particularly to such sensors utilizing pendulum systems.

2. Description of the Prior Art

Prior art level sensors utilizing inverted pendulums contain counterweight sytems to control the equilibrium of the inverted pendulum. These counterweight systems restrict the movement of the inverted pendulum as well as the accuracy of sensing the angle of inclination.

SUMMARY OF THE INVENTION

The present invention is a hydraulic fluidic level control sensor for detecting an angular deviation from the gravity vertical. One embodiment of the present invention comprises an inverted pendulum in conjunction with two fluidic proximity sensors to provide an output signal proportional to the angular deviation. Opposing fluid jets from the fluidic proximity sensors impinge on the inverted pendulum shaft to produce a net jet force which counterbalances the pendulum moment due to gravity. The pressure signal output from the proximity sensors is proportional to the angular deviation from the vertical and provides the input signal to a level control system. A secondary pendulum damping system is utilized to provide necessary viscous damping.

One object of the present invention is to provide a level control sensor that is more accurate, sensitive, dependable and inexpensive than prior art sensors.

Other objects and a more complete appreciation of the present invention and its many attendant advantages will develope as the same becomes better understood by reference to the following detailed description when considered in conjunction with the accompanying drawings in which like reference numerals designate like parts throughout the figures thereof and wherein.

DETAILED DESCRIPTION OF THE PREFERRED EMBODIMENT

Figure 1:
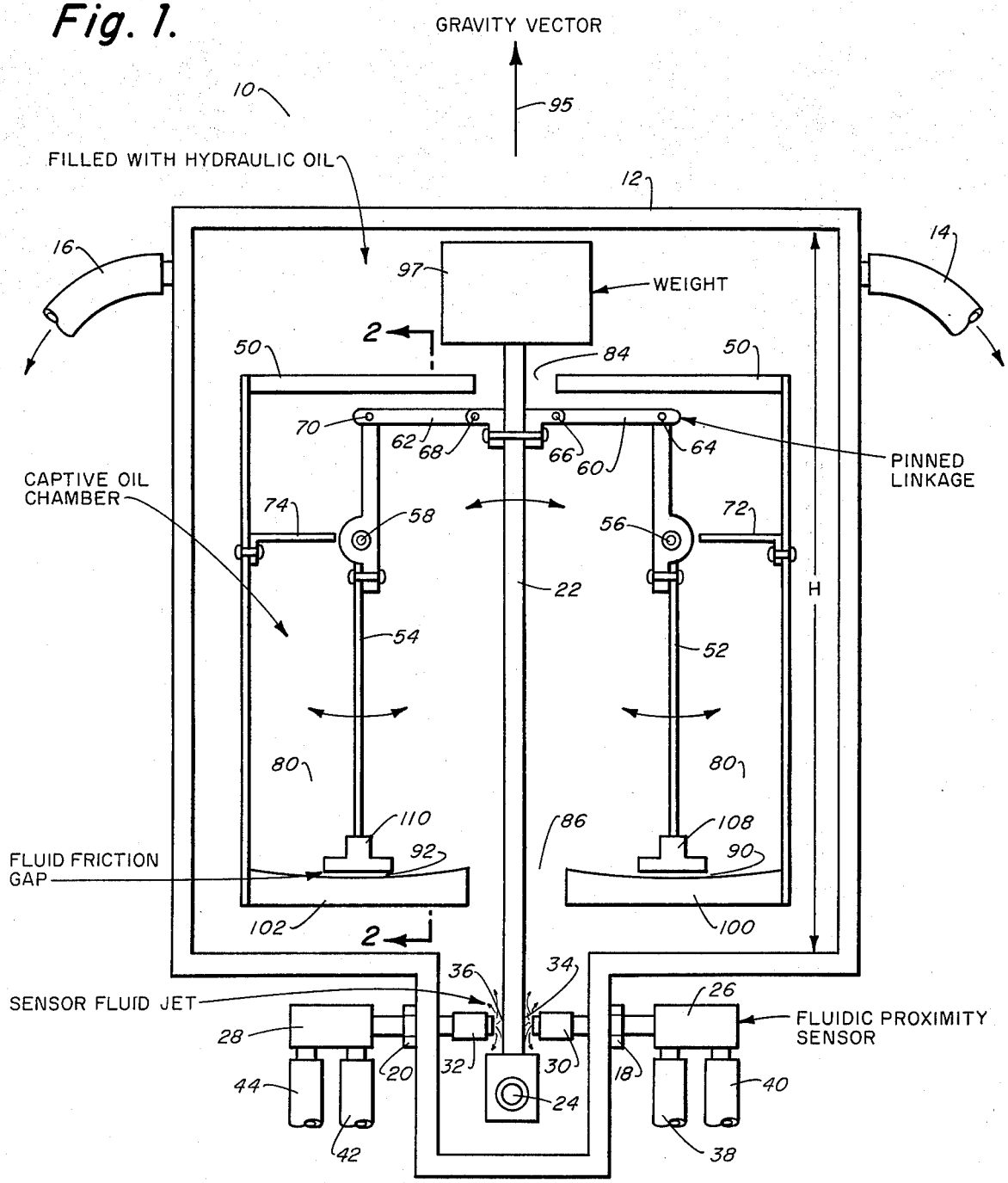
FIG. 1 is a cross-sectional view of one embodiment of the present invention.
Figure 2:
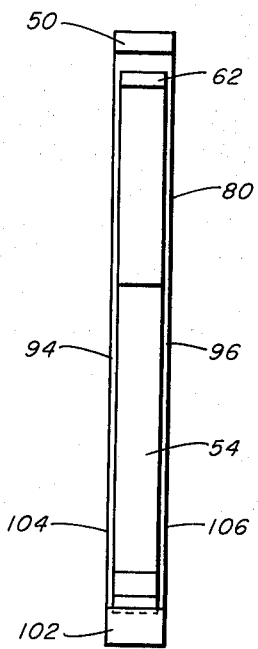
FIG. 2 is a sectional view taken along line 2–2 of FIG. 1.

FIGS. 1 and 2 of the drawings illustrate one embodiment 10 of the present invention. Embodiment 10 includes a fluid-filled enclosure 12. Enclosure 12 has a pair of fluid outlets 14 and 16 and a pair of fluid inlets 18 and 20.

Inverted pendulum 22 is disposed within enclosure 12 to rotate about shaft 24. Shaft 24 is fixed with respect to enclosure 12.

A pair of fluidic proximity sesors 26 and 28 having nozzles 30 and 32, respectively, are disposed in fluid inlets 18 and 20, respectively. Nozzles 30 and 32 are disposed adjacent the shaft of inverted pendulum 22 such that fluidic jets exiting nozzle 30 and 32 impinge upon the shaft of inverted pendulum 22 at points 34 and 36, respectively, located near shaft 24.

Connected between fluid outlets 14 and 16 and supply pressure inlets 38 and 42 are such necessary and sufficient pumps, reservoirs, and associated equipment as required to ensure a constant supply of oil into and out of enclosure 12. Such pumps, reservoirs, and associated equipment are not shown in the drawings, as such is well known to those having average skill in the art.

Sensor 26 includes a supply pressure fluid input 38 and a sensing pressure fluid input 40. Sensor 28 includes a supply pressure fluid input 42 and a sensing pressure fluid input 44. Further discussion of sensors 26 and 28 is forthcoming infra.

Damping system 50 is connected to inverted pendulum 22. Damping system 50 comprises a pair of damper pendulums 52 and 54 disposed to rotate about shafts 56 and 58, respectively. Shafts 56 and 58 are fixed with respect to enclosure 12. Pendulums 52 and 54 are pivotally connected to pendulum 22 via pinned members 60 and 62, respectively. Thus pendulums 52 and 54 rotate about shafts 56 and 58, respectively, as inverted pendulum 22 rotates about shaft 24. Pinned member 60 is connected between pendulums 22 and 52 at pin points 64 and 66, while pinned member 62 is connected between pendulums 22 and 54 at pin points 68 and 70. Stops 72 and 74 are disposed adjacent shafts 56 and 58.

Captive fluid chamber 80 houses pendulums 52 and 54. Chamber 80 is located within enclosure 12. Openings 84 and 86 in chamber 12 permit unimpeded movement of pendulum 22 for normal operating conditions. Pendulums 52 and 54 provide damping by creating high resistance to the fluid flowing from captive fluid chamber 80 whenever inverted pendulum 22 changes its equilibrium position. The high resistance is provided by fluid friction gaps 90, 92, 94 and 96 (FIG. 2) created between pendulums 52 and 54 and chamber 80. Curved first and second fluid friction members 100 and 102 of chamber 80 and pendulums 52 and 54 provide gaps 90 and 92, while side members 104 and 106 of chamber 80 and pendulums 52 and 54 provide gaps 94 and 96. Of course, the amount of damping can be varied simply by varying the gaps 90, 92, 94 and 96. Gap 90, 92, 94 and 96 are typically on the order of .015 inch. Of course, gap width varies with the viscosity of the fluid employed. In addition, it is noted that for some applications, weights 108 and 110 of pendulums 52 and 54, respectively, are unnecessary for proper operation. Sufficient damping is provided by gaps 94 and 96 in those cases.

In embodiment 10, the damping provided by damping system 50 renders the embodiment 10 insensitive to rapid motion, i.e., a cut-off frequency of approximately one hertz is provided to embodiment 10.

Embodiment 10 of FIGS. 1 and 2 operates as follows. When enclosure 12 rotates from its reference position, inverted pendulum 22 rotates with respect to and in the same direction as enclosure 10 due to the force of gravity. Note in the reference position, inverted pendulum 22 is parallel to the gravity vector 95. Rotation of inverted pendulum 22 causes the sensor jets from nozzles 30 and 32 to become unbalanced, giving a resultant net force on the shaft of pendulum 22, which opposes the motion of pendulum 22. Pendulum 22 seeks an equilibrium position which is determined by the gravity moment of weight 97 and the sensor jet forces from nozzles 30 and 32 about pivot shaft 24. At this equilibrium position, a differential pressure signal will exist at sensing pressure fluid outputs 40 and 44 of sensors 26 and 28, respectively. This output pressure signal is utilized as an input signal to a hydraulic servo system (not shown) to rotate the object upon which enclosure 12 is mounted to the original gravity vertical orientation or reference position. Thus, this output signal contains information as to the direction and angle of inclination of enclosure 12 with respect to the reference position.

Fluid enters enclosure 12 through nozzles 30 and 32 from supply pressure inputs 38 and 42, respectively. The fluid exists enclosure 12 through fluid outlets 14 and 16. Thus, enclosure 12 is completely filled with fluid during normal operation of embodiment 10.

It is noted that enclosure 12 is of uniform depth. One fluid deemed to provide satisfactory results is hydraulic oil MIL-H-5606.

Figure 3:
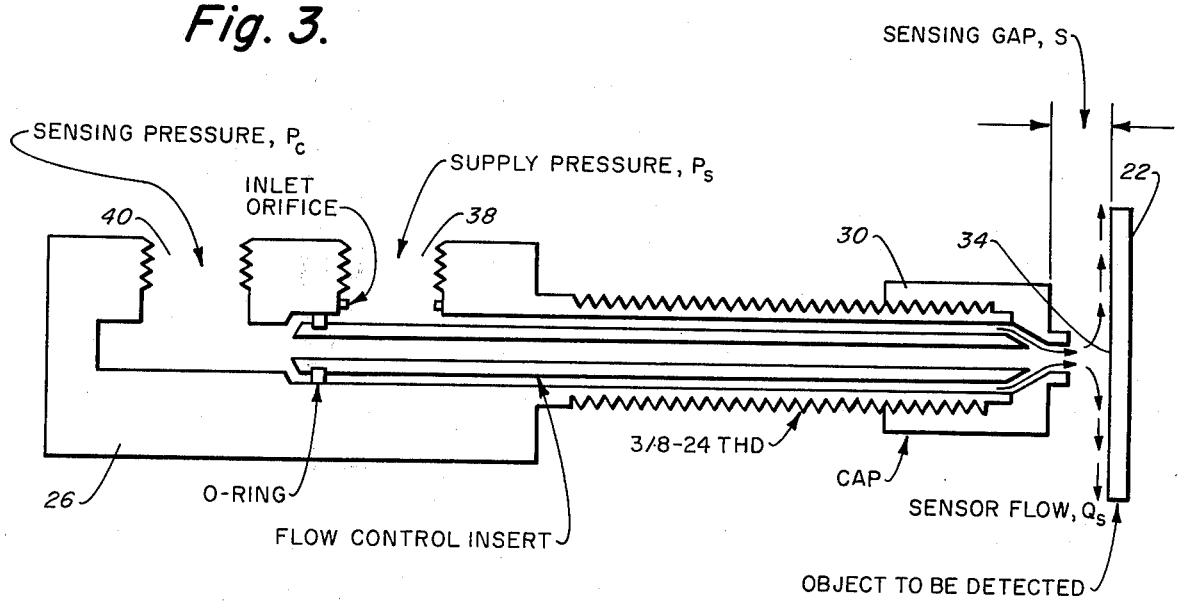
FIG. 3 is a cross-sectional view of one proximity sensor of FIG. 1.

FIG. 3 illustrates a cross-section of proximity sensor 26. Sensor 28 is identical to sensor 26. Such proximity sensors utilizing pneumatics, typically air, are readily available off-the-shelf items. However, to achieve satisfactory operational results using hydraulic oil, certain modifications must be made. A throrough discussion of these modifications is given in Fashbaugh and Durlak, *Application of Fluidic Concepts to Hydraulic Control Systems*, Technical Note N-1349, July 1974, Civil Engineering Laboratory, Port Hueneme, California. Alternate damping methods can be utilized. These include the use of dashpots and/or friction between two lubricated surfaces. Inverted pendulum 22 may be replaced by an inverted compound pendulum in which case fluidic proximity sensors 26 and 28 would be disposed differently. In addition, pendulums 52 and 54 could be replaced by compound pendulums.

Obviously many modifications and variations of the present invention are possible in light of the above teachings. It is therefore to be understood that within the scope of the appended claims the invention may be practiced otherwise than as specifically described herein.

We claim:
1. A hydraulic level control sensor comprising:
   a. a fluid filled enclosure having first and second fluidic inlets and at least one fluidic outlet;
   b. an inverted pendulum pivotally mounted within said enclosure for assuming new positions of equilibrium with respect to a reference position as the inclination of said enclosure changes;
   c. first and second fluidic sensing means disposed adjacent said inverted pendulum for sensing the direction and angle of inclination of said inverted pendulum with respect to said reference position, said first and second sensing means being in fluidic communication with said first and second fluidic inlets, respectively;
   d. first and second pendulums pivotally connected to said inverted pendulum and pivotally connected to respective first and second shafts, said shafts being connected to said enclosure; and
   e. first and second fluid friction members disposed adjacent said first and second pendulums, respectively, such that first and second fluid friction gaps are formed therebetween, said first and second pendulums and said first and second fluid friction members rendering said inverted pendulum insensitive to rapid movements of said enclosure.

2. The apparatus of claim 1 wherein said first and second fluid friction members comprise a captive fluid chmber within said first and second pendulums are respectively disposed, said chamber being in fluidic communication with said fluid-filled enclosure.

3. The apparatus of claim 1 wherein said first and second fluidic means includes first and second fluidic proximity sensors having respective first and second fluid jets impinging upon said inverted pendulum.

* * * * *